United States Patent

Hancock

[11] Patent Number: 5,928,101
[45] Date of Patent: Jul. 27, 1999

[54] DIFFERENTIAL GEAR MECHANISM

[76] Inventor: Frank John Thompson Hancock, Oak Brow Serotina Beechfield Road, Alderley Edge Cheshire SK9 7AT, United Kingdom

[21] Appl. No.: 08/943,613

[22] Filed: Oct. 3, 1997

[30] Foreign Application Priority Data

| Apr. 4, 1995 | [GB] | United Kingdom | 9506976 |
| Nov. 22, 1995 | [GB] | United Kingdom | 9523877 |
| Mar. 1, 1997 | [GB] | United Kingdom | 9704281 |

[51] Int. Cl.$^6$ .................................................. F16H 48/12
[52] U.S. Cl. ........................................ 475/184; 475/228
[58] Field of Search ................... 475/184–196, 475/197, 220, 228

[56] References Cited

U.S. PATENT DOCUMENTS

| 688,266 | 12/1901 | Sandell | 475/228 X |
| 1,061,450 | 5/1913 | Coleman | 475/228 X |
| 3,130,604 | 4/1964 | Johnson et al. | |
| 3,812,929 | 5/1974 | Farqué | |
| 4,570,731 | 2/1986 | Oaks | |
| 4,617,838 | 10/1986 | Anderson | 475/196 X |
| 5,061,228 | 10/1991 | Hagqvist | 475/196 X |
| 5,321,988 | 6/1994 | Folino | 475/196 X |
| 5,415,595 | 5/1995 | Nelson | 475/221 X |
| 5,423,725 | 6/1995 | Inoue | 475/196 |
| 5,431,606 | 7/1995 | Bingham | 475/228 |
| 5,526,889 | 6/1996 | Neary | |
| 5,577,423 | 11/1996 | Mimura | 475/196 X |
| 5,607,370 | 3/1997 | Maslow et al. | 475/196 |

FOREIGN PATENT DOCUMENTS

| 1604164 | 9/1971 | France . |
| 1098873 | 1/1968 | United Kingdom . |
| 1198467 | 7/1970 | United Kingdom . |
| 9506976 | 4/1995 | United Kingdom . |
| 2293634 | 9/1996 | United Kingdom . |
| 9704281 | 3/1997 | United Kingdom . |
| WO 96/31713 | 10/1996 | WIPO . |

*Primary Examiner*—Dirk Wright
*Assistant Examiner*—Peter T. Kwon
*Attorney, Agent, or Firm*—John R. Ley

[57] ABSTRACT

A differential gear mechanism includes an input member (111) mounted for rotation with respect to output half-shafts (112, 113), each half-shaft fixedly carrying an output member (114, 115). A coupling member (117) mounted for rotation about an axis radial of the half-shafts (112, 113) positively engages the output members (114, 115) and permits relative rotation of the output members (114, 115) on their half-shafts (112, 113). The output members include recesses for receiving teeth of a toothed wheel coupling member. The recesses of the output member comprise indentations.

7 Claims, 2 Drawing Sheets

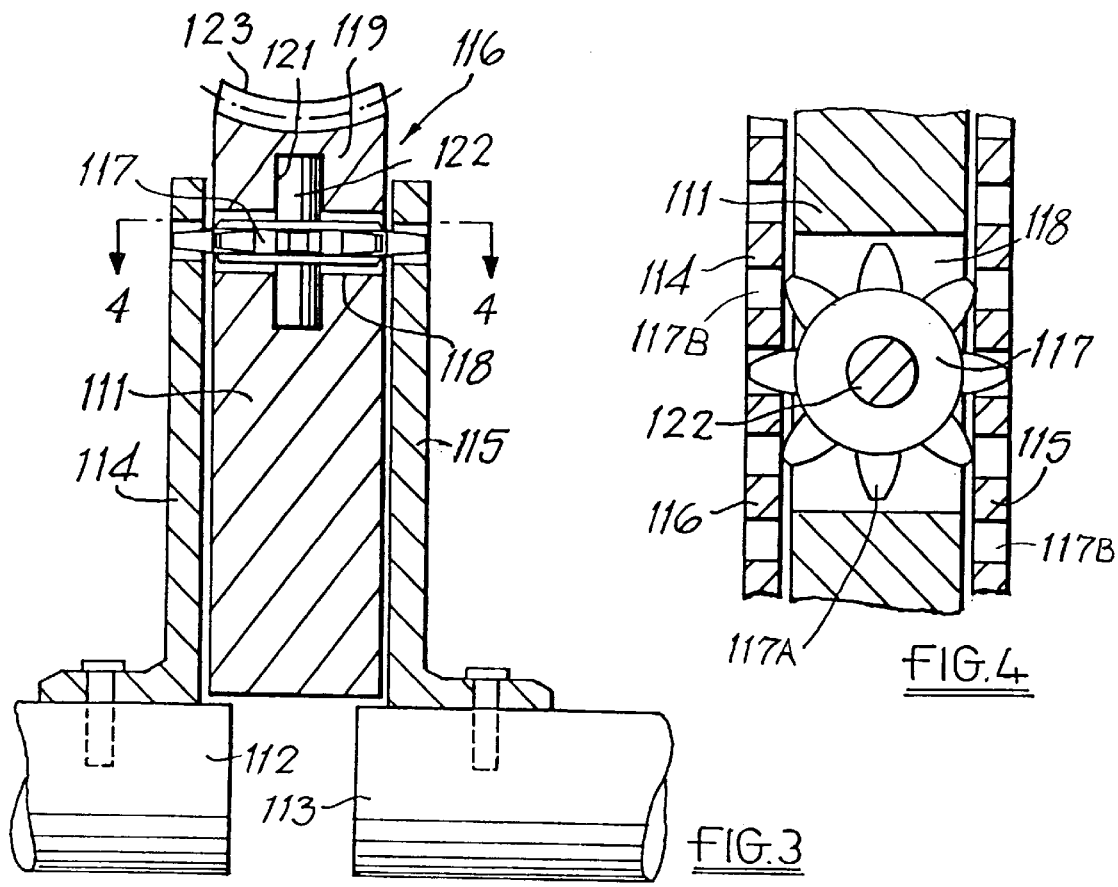
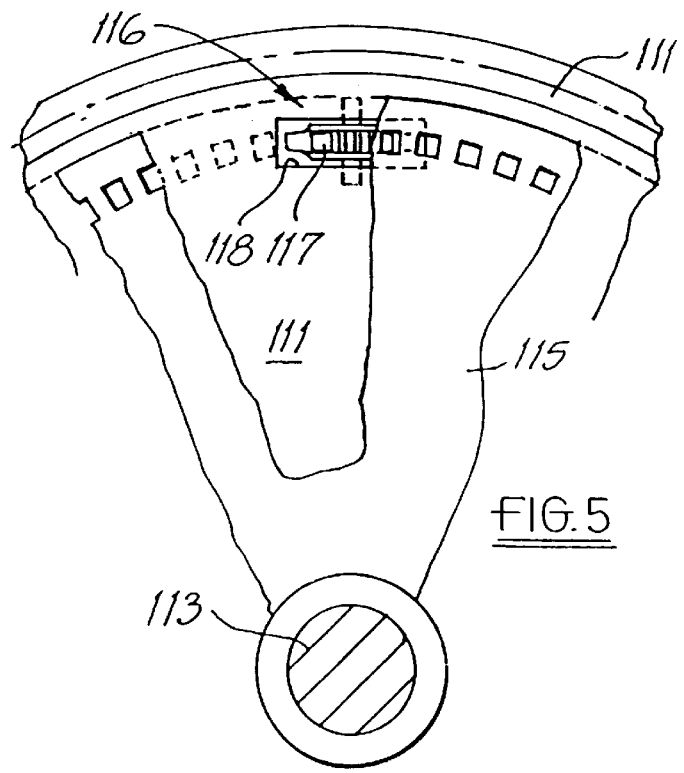

DIFFERENTIAL GEAR MECHANISM

INTRODUCTION

This invention relates to differential gears, and particularly to differential gears used with relatively low torque motors.

BACKGROUND OF THE INVENTION

Differential gears permit the relative rotation of two shafts driven by a third drive shaft, the sum of the rotation rates of the driven shafts being constant. Differential gears typically comprise a drive shaft which rotates a cage containing a planetary bevel wheel or wheels which mesh with two bevel wheels, one on each of the driven shafts. The meshed bevel wheels cause the sum of the rotation rates of the driven shafts to be constant, although they may rotate at different rates.

Such differential gears are widely used, for example in cars, but the manufacture of the cage and bevel wheels is expensive and places a price barrier upon goods containing differential gears.

The present invention overcomes the problems of the prior art, and provides a simple, convenient, less expensive differential gear.

SUMMARY OF THE INVENTION

According to the present invention there is provided a differential gear mechanism comprising an input member constituting a cage for rolling means mounted for rotation about an output axis. A drive input means operates to rotate the input member about the output axis. Output half-shafts are also mounted for rotation about the output axis on either side of the input member, with each half-shaft having an attached clutch plate. The clutch plates are disposed either side of the input member and are urgeable together so as to clutch against the rolling means, whereby a differential output effect is achieved by the clutch plates rolling over the rolling means.

The differential comprises at least one rolling means and may comprise up to six or more rolling means. If two or more rolling means are utilized, at least two of the rolling means may be at different radii from the output axis.

The cage may comprise a perforated plate and the rolling means (e.g., balls) may be of a width greater than that of the cage. Thus, for example, the present invention may comprise a plate with six perforations, the perforations being at different radii from the output axis, and housing balls of a width greater than that of the perforated plate.

The clutch plates may be urged together by angular contact bearings and Belleville washer arrangements, or by any other convenient means.

The differential is preferably lubricated and may either be lubricated by oil or be self-lubricating. For example, the input member may comprise a self-lubricating plastic. Hence a self-lubricating differential may be made according to the invention, which may be a sealed unit.

The drive input means may comprise a worm wheel, a spur gear, a bevel gear, a friction drive, a V-belt or a toothed belt, or any other convenient means.

According to a second embodiment of the invention, the differential gear mechanism comprises an input member mounted for rotation with respect to output half-shafts each fixedly carrying an output member and coupling means coupling the input differentially to the output members, said coupling means comprising at least one coupling member mounted in a throughway of the input member to extend from it towards the output members. The coupling member rotates about an axis radial of the half-shafts and positively engages both the output members. Rotation of the coupling member about its axis thus permits relative rotation of the output members on their respective half-shafts.

The input member may comprise a circular disc and said throughway may comprise a chordal slot. Said chordal slot may include a bearing arrangement for the coupling member. Said bearing arrangement may comprise a bore adapted to receive a pin on which the coupling member rotates. Said bore may be drilled in from the periphery of said input member, or molded from one side.

The coupling member may comprise a toothed wheel, the teeth of which engage in complementary recesses in the output members. The recesses may comprise throughways or indentations.

The input member is preferably adapted to be driven peripherally, such as by a worm drive.

A differential gear according to the present invention may be easily manufactured and may be advantageously used in a number of applications such as golf trolleys which would not use a conventional differential gear due to the additional cost it would impose. Other particular applications may include those which would impose relatively low forces (i.e. power/torque) upon the differential gear.

The invention will be further apparent from the following description, with reference to the figures of the accompanying drawing, which show, by way of example only, two alternative differential gear mechanisms.

BRIEF DESCRIPTION OF THE DRAWINGS

FIG. 3 is an elevated axial/half section of a second embodiment of the differential gear mechanism of the present invention.

FIG. 4 is a section view taken substantially along the line 4—4 of FIG. 3.

FIG. 5 is an elevated partial side view of the differential gear illustrated in FIG. 3, with a portion broken away for clarity.

DETAILED DESCRIPTION

Figure 1:
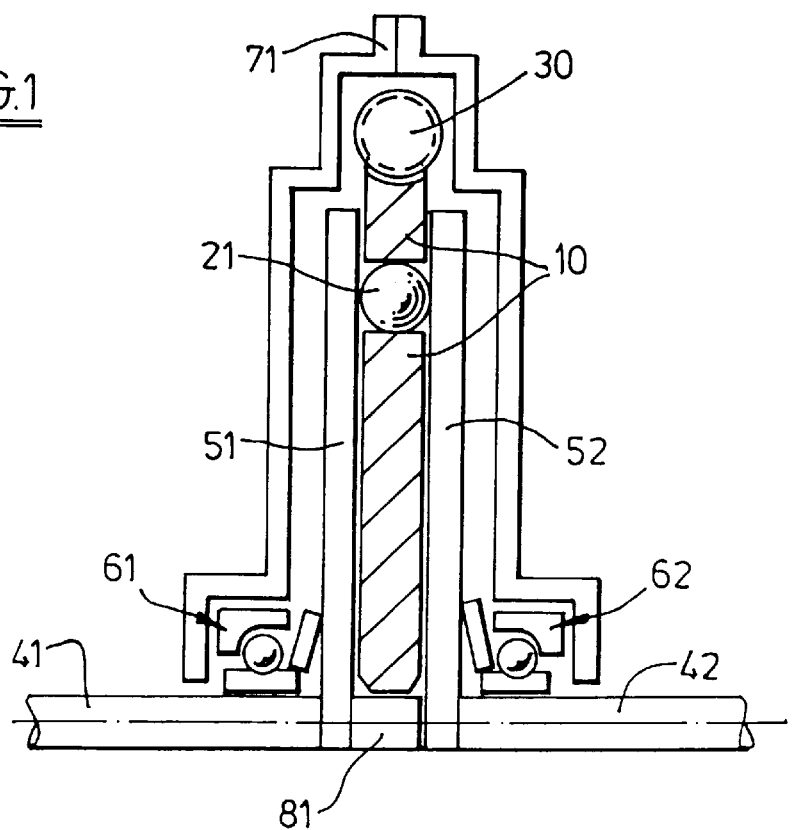
FIG. 1 is an elevated axial/half section of a first embodiment of a differential gear mechanism of the present invention.

FIG. 1 illustrates a first embodiment of a differential gear mechanism according to the present invention which includes an input member 10 constituting a cage for rolling means 21, 22 and 23 (FIG. 2) and which further includes drive input means 30. The input member 10 is preferably mounted for rotation about an output axis of output half-shafts 41 and 42 positioned either side of the input member 10, each half-shaft having a clutch plate 51 and 52, respectively. The clutch plates 51 and 52 are disposed either side of the input member 10 and are urgeable together so as to clutch against said rolling means (21, 22 and 23) whereby a differential output effect is achieved by the clutch plates 51 and 52 rolling over the rolling means 21, 22 and 23.

Figure 2:
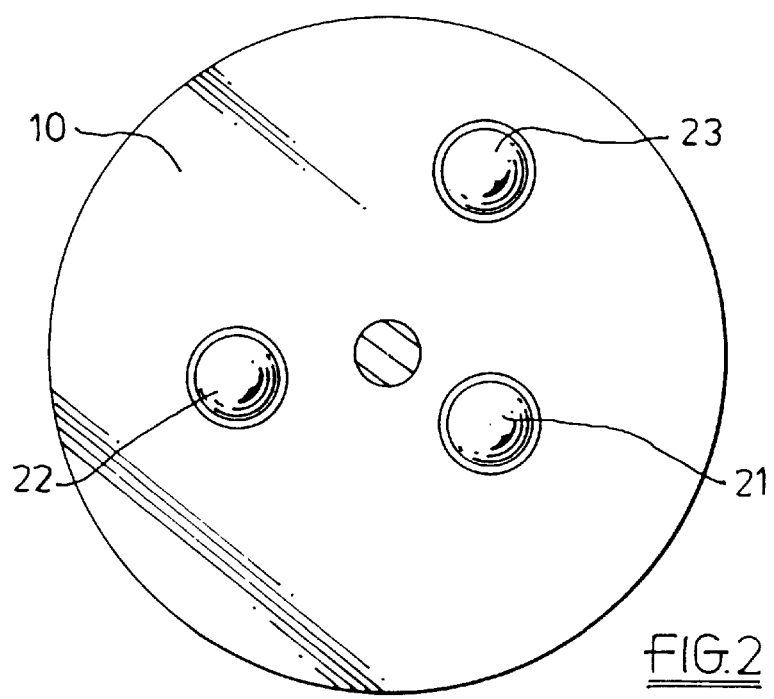
FIG. 2 is an elevated side view of a cage of the differential gear illustrated in FIG. 1, taken along the gear axis.

The input member or cage 10 preferably comprises a perforated plate as shown in FIG. 2. The rolling means 21, 22 and 23 preferably comprise balls positioned at different radii from the output axis. The balls 21, 22 and 23 are of a width greater than that of the cage 10.

The clutch plates 51 and 52 are urged together by angular contact bearings and Belleville washer arrangements 61 and 62, though other loading arrangements may be used.

The drive input means 30 preferably comprises a worm wheel.

The differential is contained within a casing 71. The differential is lubricated, as by oil or grease, but may also be self-lubricating. For example, the input member 10 may comprise a self-lubricating plastic.

The input member 10 is mounted on supporting means 81 attached to clutch plate 51 such that the input member 10 rotates about the output axis independently of the supporting means 81 and any rotation thereof.

The clutch plates may be nitrided or surface coated to increase hardness. It is preferred to have the rolling means somewhat harder than the clutch plates. For example, the rolling means may have a hardness of 65–68 Rockwell C, while the clutch plates may have a hardness of 50–55 Rockwell C. This, for one particular application, has been found to minimize wear (which results in grooving of the plates) while affording good frictional contact, especially with grease or oil lubrication, possibly because the pressure is high enough to cut through the lubricant film.

A second embodiment (FIGS. 3–5) of the differential gear mechanism of the present invention does not rely on the clutch arrangement utilized in the first embodiment (FIGS. 1 and 2) described above. Rather, the second embodiment of the differential gear mechanism includes an input member 111 mounted for rotation with respect to output half-shafts 112 and 113. Each output half-shaft (112, 113) is attached to an output member 114 and 115, respectively, as shown in FIG. 3. Coupling means 116 couples the input member 111 differentially to the output members 114 and 115.

The coupling means 116 preferably comprises at least one coupling member 117 mounted in a throughway 118 of the input member 111 to extend from the input member 111 towards the output members 114 and 115. The coupling member 117 is mounted for rotation about an axis radial of the half-shafts 112 and 113 and for positive engagement with the output members 114 and 115 (FIGS. 3 and 4). Rotation of the coupling member 117 about its axis of rotation thus permits relative rotation of the output members 114 and 115 on their respective half-shafts 112 and 113.

The input member 111 preferably comprises a circular disc which is adapted to be driven peripherally, as by a worm wheel. The input member 111 may be of metal or plastic material, and the throughway 118 preferably comprises a chordal slot, which may be cast, molded in, or machined out. The chordal slot 118 includes a bearing arrangement 119 (FIG. 3) for the coupling member 117, said bearing arrangement 119 including a bore 121 adapted to receive a pin 122 on which the coupling member 117 rotates. The bore 121 is preferably drilled from a periphery 123 of the input member 111. If, as is possible, the input member disc 111 is molded, a slot may be molded in from one face to receive the pin 122 which is essentially captive after assembly.

The coupling member 117 preferably comprises a toothed wheel, the teeth 117A of which engage in complementary recesses 117B in the output members 114 and 115. The recesses 117B comprise throughways or indentations which may be cast, molded in, or machined out.

The second embodiment of the differential gear is robust, compact and can be accommodated within a gear box. For low speed applications, balance is not a problem and a single coupling member 117 can suffice. The engagement of the coupling member 117 with the output members 114 and 115 is at a distance from the half-shafts 112 and 113, and the resulting mechanical advantage, reduces the forces so that the coupling member itself need not be robust—a steel pressing or stamping, or even a plastic molding, may be found adequate. Additionally, the teeth 117A of the coupling member 117 can be of any shape found satisfactory for positive engagement with the recesses 117B.

The second embodiment of the differential gear mechanism is relatively simple to manufacture. Assembly of the components is straightforward. Additionally, due to the positive engagement between the coupling member 117 and the output members 114 and 115, there is no need to maintain contact pressure sufficient to ensure non-slip operation as in the first embodiment. Thus, the second embodiment of the differential gear mechanism simplifies the manufacturing process and avoids the expense associated with the above-described surface hardness specifications of the clutch plates (51 and 52) and the rolling means (21, 22 and 23) of the first embodiment.

Although both the first and second embodiments of the differential gear of the present invention are useful in connection with golf trolleys, they will clearly find application in many other drive trains.

Embodiments of the present invention have been shown and described with a degree of particularity. This description is not intended to necessarily limit the scope of the invention. The scope of the invention is defined by the following claims.

The invention claimed is:

1. A differential gear mechanism gear comprising:
   an input member mounted for rotation about an output axis;
   drive input means for rotating the input member about the output axis;
   output half-shafts positioned either side of the input member for rotation about the output axis, each output half-shaft fixedly carrying an output member for rotation with the output half-shafts about the output axis;
   coupling means coupling the input member differentially to the output members, said coupling means including at least one coupling member mounted in a throughway of the input member for rotation about an axis radial of the half-shafts, and said coupling member positively engaging each of the output members so that rotation of said coupling member about its axis of rotation permits relative rotation of the output members on their half-shafts; and wherein:
   the coupling member comprises a toothed wheel;
   the output members include recesses for receiving the teeth of the toothed wheel; and
   the recesses comprise indentations within the output members.

2. A differential gear mechanism according to claim 1, wherein:
   the input member is a circular disc; and
   the throughway is a chordal slot within the circular disc.

3. A differential gear mechanism according to claim 2, wherein the chordal slot includes a bearing arrangement for the coupling member.

4. A differential gear mechanism according to claim 3, wherein the bearing arrangement includes a bore adapted to receive a pin on which the coupling member rotates.

5. A differential gear mechanism according to claim 4, wherein the bore is drilled from a periphery of the circular disc.

6. A differential gear mechanism according to claim 1, wherein the recesses comprise throughways within the output members.

7. A differential gear mechanism according to claim 1, wherein the drive input means comprises a worm drive.

* * * * *